(12) United States Patent
Rex

(10) Patent No.: US 11,989,867 B2
(45) Date of Patent: May 21, 2024

(54) IMAGE RECOGNITION OF PROPERTY DEFECTS

(71) Applicant: Peter L. Rex, Bellevue, WA (US)

(72) Inventor: Peter L. Rex, Bellevue, WA (US)

( * ) Notice: Subject to any disclaimer, the term of this patent is extended or adjusted under 35 U.S.C. 154(b) by 260 days.

(21) Appl. No.: 17/353,369

(22) Filed: Jun. 21, 2021

(65) Prior Publication Data

US 2021/0398264 A1    Dec. 23, 2021

Related U.S. Application Data

(60) Provisional application No. 63/041,537, filed on Jun. 19, 2020.

(51) Int. Cl.
*G06T 7/00* (2017.01)

(52) U.S. Cl.
CPC .. *G06T 7/0002* (2013.01); *G06T 2207/30184* (2013.01)

(58) Field of Classification Search
None
See application file for complete search history.

(56) References Cited

U.S. PATENT DOCUMENTS

| | | | |
|---|---|---|---|
| 8,756,085 B1 | 6/2014 | Plummer et al. | |
| 8,775,570 B2 | 7/2014 | Sandholm | |
| 10,222,301 B2 | 3/2019 | Da Silva et al. | |
| 10,423,934 B1 | 9/2019 | Zanghi | |
| 10,529,028 B1 | 1/2020 | Davis | |
| 10,679,301 B1 | 6/2020 | Veliche | |
| 10,832,345 B1 | 11/2020 | Santos | |
| 11,032,328 B1 | 6/2021 | Little | |
| 11,132,481 B1 | 9/2021 | Davis | |
| 2004/0215701 A1 | 10/2004 | Vrajich | |
| 2005/0278189 A1* | 12/2005 | Mercadante | ......... G06Q 50/205 705/7.42 |
| 2010/0223581 A1 | 9/2010 | Manolescu et al. | |
| 2010/0235228 A1 | 9/2010 | Torress | |

(Continued)

FOREIGN PATENT DOCUMENTS

| | | |
|---|---|---|
| WO | 199715023 A2 | 4/1997 |
| WO | WO199715023 A2 | 4/1997 |

(Continued)

OTHER PUBLICATIONS

International Search Report dated Jul. 27, 2021 for International Application No. PCT/US21/29678.

(Continued)

*Primary Examiner* — Tahmina N Ansari
(74) *Attorney, Agent, or Firm* — P G Scott Born; FISHERBROYLES, LLP

(57) ABSTRACT

At least one computer-readable medium on which are stored instructions that, when executed by one or more processing devices, enable the one or more processing devices to perform a method. The method includes the steps of receiving from a user a 360-degree image of a property, performing on the image an image recognition routine, the image recognition routine identifying one or more defects in the property, determining from the image measurements of one or more objects associated with the one or more defects in the property, and estimating a type and quantity of material necessary to remedy the identified one or more defects.

7 Claims, 4 Drawing Sheets

(56) References Cited

U.S. PATENT DOCUMENTS

| | | |
|---|---|---|
| 2011/0137745 A1 | 6/2011 | Goad et al. |
| 2011/0282793 A1 | 11/2011 | Mercuri et al. |
| 2012/0316930 A1 | 12/2012 | Clemenson |
| 2013/0171593 A1 | 7/2013 | Gorman et al. |
| 2014/0108078 A1 | 4/2014 | Davis |
| 2014/0156681 A1 | 6/2014 | Lee et al. |
| 2014/0235197 A1 | 8/2014 | Corner et al. |
| 2014/0324450 A1 | 10/2014 | Hicks et al. |
| 2014/0324696 A1 | 10/2014 | Browne et al. |
| 2014/0365256 A1 | 12/2014 | Duff |
| 2015/0142906 A1 | 5/2015 | Tolcher |
| 2015/0149349 A1 | 5/2015 | Lee |
| 2015/0213716 A1 | 7/2015 | Goel |
| 2016/0071162 A1 | 3/2016 | Ogawa et al. |
| 2016/0148363 A1 | 5/2016 | Phan et al. |
| 2016/0292371 A1 | 10/2016 | Alhimiri |
| 2017/0147991 A1 | 5/2017 | Franke |
| 2018/0158156 A1 | 6/2018 | Dintenfass |
| 2018/0159838 A1 | 6/2018 | Dintenfass |
| 2018/0293669 A1 | 10/2018 | Jackson |
| 2018/0373931 A1 | 12/2018 | Li |
| 2019/0020817 A1 | 1/2019 | Shan et al. |
| 2019/0095832 A1 | 3/2019 | Frederico et al. |
| 2019/0172161 A1 | 6/2019 | Conboy |
| 2019/0180105 A1 | 6/2019 | Sasson |
| 2019/0236732 A1 | 8/2019 | Speasl et al. |
| 2020/0117336 A1 | 4/2020 | Mani |
| 2020/0184706 A1* | 6/2020 | Speasl .................. H04L 9/0643 |
| 2020/0402318 A1* | 12/2020 | Terry ..................... H04N 23/45 |
| 2021/0081698 A1 | 3/2021 | Lindeman |
| 2021/0174492 A1 | 6/2021 | Karaasian |
| 2021/0398264 A1* | 12/2021 | Rex ........................ G06Q 10/20 |

FOREIGN PATENT DOCUMENTS

| | | |
|---|---|---|
| WO | WO2018208226 A1 | 11/2018 |
| WO | WO2019144317 A1 | 8/2019 |

OTHER PUBLICATIONS

International Search Report dated Jul. 27, 2021 for International Application No. PCT/US21/29695.
International Search Report dated Jul. 27, 2021 for International Application No. PCT/US21/29723.
International Search Report dated Aug. 5, 2021 for International Application No. PCT/US21/29730.
International Search Report dated Aug. 3, 2021 for International Application No. PCT/US21/29612.
International Search Report dated Sep. 30, 2021 for International Application No. PCT/US21/38225.
International Search Report dated Sep. 30, 2021 for International Application No. PCT/US21/38271.
International Search Report dated Sep. 15, 2021 for International Application No. PCT/US21/38293.
International Search Report dated Oct. 1, 2021 for International Application No. PCT/US21/38308.

* cited by examiner

Commodity Image Recognition
410

Maintenance Tech Image Rec
420

IMAGE RECOGNITION OF PROPERTY DEFECTS

PRIORITY CLAIM

This application claims priority from U.S. Provisional Patent Application Ser. No. 63/041,537 filed Jun. 19, 2020, the entirety of which is hereby incorporated by reference as if fully set forth herein.

BACKGROUND

Problems associated with property diagnosis and repair services include high cost, high levels of travel and lengthy times to complete the services.

DRAWING FIGURES

Figure 3:
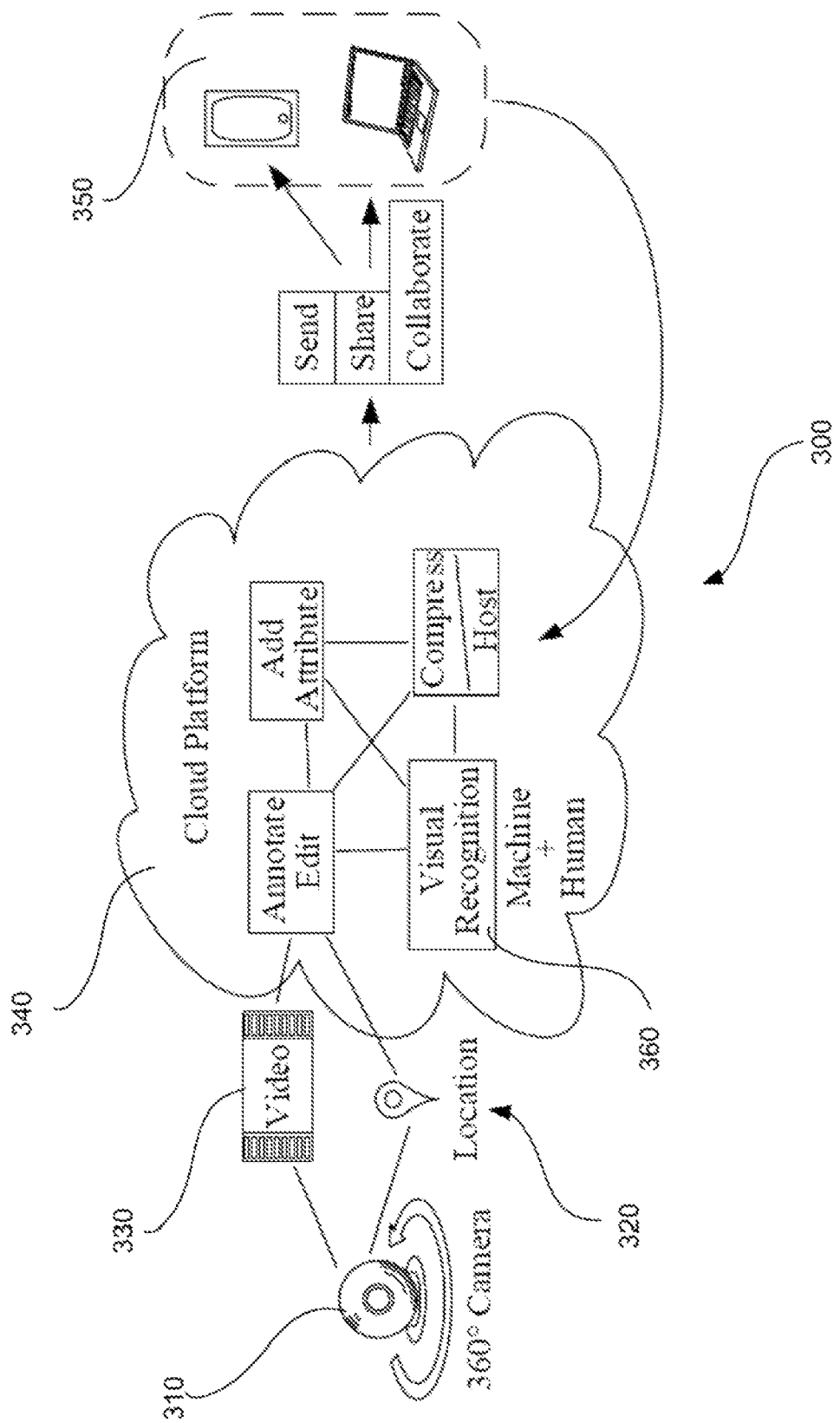

FIG. 3 schematically illustrates a system according to an embodiment of the invention; and FIG. 4 schematically illustrates components of a system according to an embodiment of the invention.

DETAILED DESCRIPTION

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Embodiments of the invention may be described in the general context of computer-executable instructions, such as program modules, being executed by a processing device having specialized functionality and/or by computer-readable media on which such instructions or modules can be stored. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Embodiments of the invention may include or be implemented in a variety of computer readable media. Computer readable media can be any available media that can be accessed by a computer and includes both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices and can be used to implement or otherwise perform practical applications.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

Figure 1:
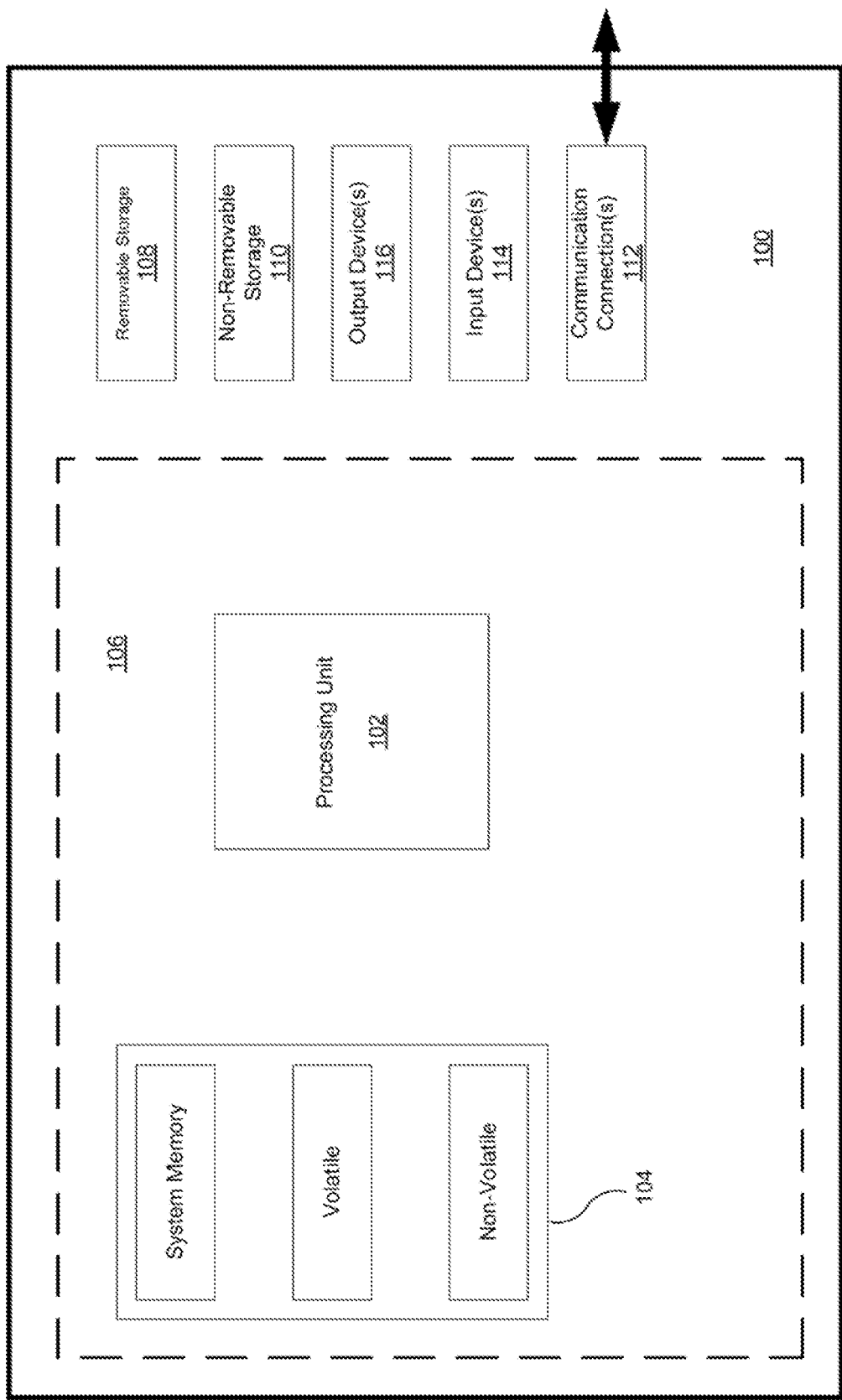
FIG. 1 is a schematic view of an exemplary operating environment in which an embodiment of the invention can be implemented.

With reference to FIG. 1, an exemplary system for implementing an embodiment of the invention includes a computing device, such as computing device 100, which, in an embodiment, is or includes a smartphone. The computing device 100 typically includes at least one processing unit 102 and memory 104.

Depending on the exact configuration and type of computing device, memory 104 may be volatile (such as random-access memory (RAM)), nonvolatile (such as read-only memory (ROM), flash memory, etc.) or some combination of the two. This most basic configuration is illustrated in FIG. 1 by dashed line 106.

Additionally, the device 100 may have additional features, aspects, and functionality. For example, the device 100 may include additional storage (removable and/or non-removable) which may take the form of, but is not limited to, magnetic or optical disks or tapes. Such additional storage is illustrated in FIG. 1 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

The device 100 may also include a communications connection 112 that allows the device to communicate with other devices. The communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, the communication media includes wired media such as a wired network or direct-wired connection, and wireless media such as acoustic, radio-frequency (RF), infrared, cellular and other wireless media. The term computer-readable media as used herein includes both storage media and communication media.

The device 100 may also have an input device 114 such as keyboard, mouse, pen, voice-input device, touch-input device, etc. Further, an output device 116 such as a display, speakers, printer, etc. may also be included. Additional input devices 114 and output devices 116 may be included depending on a desired functionality of the device 100.

Figure 2:
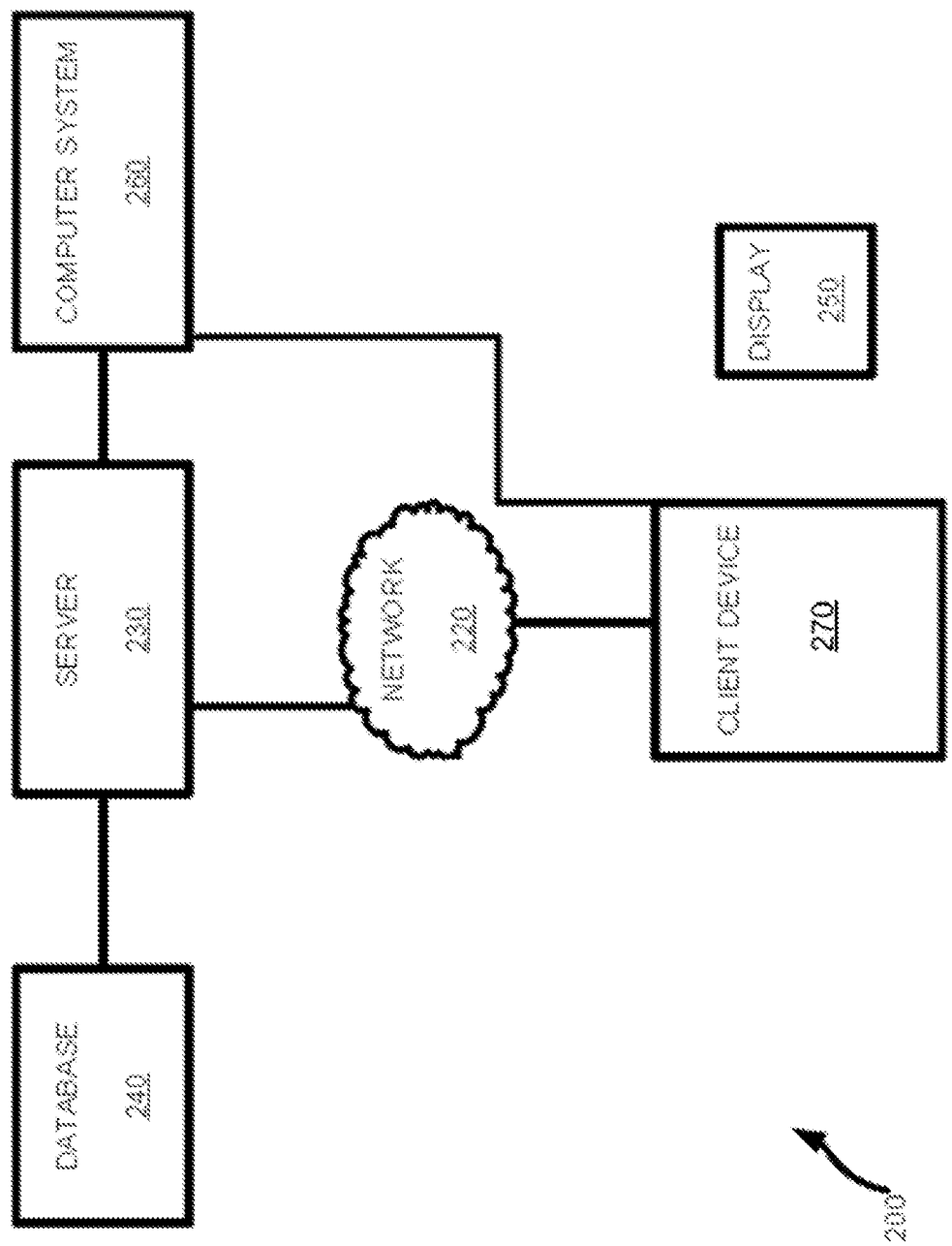
FIG. 2 is a functional block diagram of an exemplary operating environment in which an embodiment of the invention can be implemented.

Referring now to FIG. 2, an embodiment of the present invention may take the form, and/or may be implemented using one or more elements, of an exemplary computer network system 360 that, in an embodiment, includes a server 230, database 240 and computer system 260. The system 360 may communicate with an electronic client device 270, such as a personal computer or workstation, tablet or smartphone, or image-capturing device such as a camera, that is linked via a communication medium, such as a network 220 (e.g., the Internet), to one or more electronic devices or systems, such as server 230. The server 230 may further be coupled, or otherwise have access, to a database 240 and a computer system 260. Although the embodiment illustrated in FIG. 2 includes one server 230 coupled to one client device 270 via the network 220, it should be recognized that embodiments of the invention may be implemented using one or more such client devices coupled to one or more such servers.

The client device 270 and the server 230 may include all or fewer than all of the features associated with the device 100 illustrated in and discussed with reference to FIG. 1. The client device 270 includes or is otherwise coupled to a computer screen or display 250. The client device 270 may be used for various purposes such as network- and local-computing processes.

The client device 270 is linked via the network 220 to server 230 so that computer programs, such as, for example, a short message service (SMS) application, running on the client device 270 can cooperate in two-way communication with server 230. The server 230 may be coupled to database 240 to retrieve information therefrom and to store information thereto. Database 240 may have stored therein data (not shown) that can be used by the server 230 and/or client device 270 to enable performance of various aspects of embodiments of the invention. The data stored in database 240 may include, for example, standard dimensions of architectural structures (e.g., doorways, windows, etc.) and/or dimensions of other objects (e.g., furniture or other household objects) that may ordinarily be found on a real estate parcel. Additionally, the server 230 may be coupled to the computer system 260 in a manner allowing the server to delegate certain processing functions to the computer system. In an embodiment, most or all of the functionality described herein may be implemented in a desktop or smartphone application that may include one or more executable modules. In an embodiment, the client device 270 may bypass network 220 and communicate directly with computer system 260.

An embodiment of the invention provides a method of quality control and scope of work generation in the field of general contracting/property services and property goods. In an embodiment, a system according to an embodiment utilizes a combination of technology to generate a scope for and or perform quality control, i.e. bluetape, on a property-related service or good. As used herein, the term "scoping" refers to the process of collecting all requirements and dimensions of a job request in order to estimate cost, materials, duration of work, etc. This information can also feed directly into a quote for the work, which is similar to an SOW (statement of work) with the customer.

This system can help up front to communicate clear intent for the job using arrows or markers on the photos, and can help when the job is complete to do quality control and communicate further touch-up work as needed. Additionally, when possible, using space measuring devices can help to attain much more accurate estimates of square footage than is currently done by eyeballing or save time by manually measuring. Estimating length, depth, width is key to estimate labor costs, total supplies needed, etc. Technologies combined to execute may include a photo-taking device (preferably one that can shoot 360 degrees or stitch together photos to do so), a mobile device to send information remotely, software that allows writing on the photo, and data storage.

One or more embodiments may employ the following technologies: 360-degree camera hardware, machine learning, photo marking-up software, dimension-gathering technologies to measure objects (e.g., square feet, or length and width of a door or furniture).

Referring generally to FIG. 3, in a system 300 according to an embodiment, which may include a processing device and a memory, a 360-degree video and photo capture device 310, which may be provided to the property owner in an embodiment, is used on premises to record the location 320 of a required service (e.g., apartment unit). Video/photo images 330 and the location 320 of the property may then be sent and stored to a cloud platform 340 or otherwise to a processing device such as server 230. With regard to the video images 330, the cloud platform 340 enables users to annotate, edit, tag, mark-up, add attributes, and attach related photos, urls and files. Cloud platform 340 may further implement an image-recognition system 360 discussed in greater detail herein below. Additionally, the cloud platform 340 enables a user to send all or part of files to an entity 350 in order to collaborate and collect further information. The cloud platform 340 also allows users to collaborate with files from any device (e.g., mobile, tablet, desktop, etc.).

Referring more specifically to FIG. 4, video images 330 may be analyzed and processed by system 360 including a commodity-image-recognition module 410 to identify standard objects and a maintenance and repair image recognition (MAR) module 420 according to an embodiment. This MAR module 420 may be enriched by human annotation combined with machine learning to be able to automatically recognize maintenance and repair needs based on images. For example, assume the system 360 receives a photo of a living room. The image-recognition module 410 can identify all of the objects in the picture (e.g., wall, stairs, doorway, couch, table, etc.). The MAR module 420 can recognize that, for example, the wall and ceiling are damaged by water from a leak. The MAR module 420 according to an embodiment may be refined and iterated, using the annotation system discussed herein below for example, to be very strong at recognizing home maintenance and repair circumstances. This MAR module 420 according to an embodiment can also perform additional steps related to the recognized repair, as illustrated by the following examples.

If a wall and ceiling are damaged and need repair, MAR module 420 can automatically estimate the dimensions of the drywall needed for the repair using one or more other items in the image, such as doorways, windows or items of furniture, for example, as reference points. As such, in this example, by consulting standard dimensions of architectural structures (e.g., standard width of doorways) that may be stored in database 240, MAR module 420 can compare the dimensions of the damaged area with those of the detected architectural structure(s) and estimate the amount of material needed to make the repair.

In yet another example, if a fence repair is needed, MAR module 420 can estimate the dimensions of the damage to the fence and, using the standard fence-plank dimensions (e.g., length and height), which may be stored in database 240 for example, estimate the number of planks that are needed to repair the fence.

Photos and videos can be annotated with contextual information to, for example, enhance the accuracy of the MAR module 420. For example, humans can review the image and digitally tag the "ceiling" with "leak" if such is present so that MAR module 420 can further learn how a ceiling leak appears in a digital image. The system according to an embodiment can append (relate) job-specific keywords and attributes to the image (e.g., roof replacements, geo, storm, flooding, cost of repair, job type, duration, etc.). Appending human annotation can be performed using software that allows for the review and annotation of images.

An embodiment can uniquely combine real estate and maintenance feedback loops (data- and human-powered judgement) in order to extend the value of commodity image recognition models for the purpose of allowing for the automatic detection of maintenance and real estate needs from pictures of property exteriors, property interiors, and other structures.

One or more embodiments of the invention can enable the collection and annotation of images and video to provide a machine-learned model for real estate maintenance and services. The application of this image recognition to maintenance and repair enables more automated processing (e.g., scoping, pricing, etc.) and fulfillment of repair/maintenance requests. Additionally, system 200 can enable the collection of location data by using, for example, GPS associated with the device 310 to estimate cost of services. Further, system 200 can enable estimation of cost through data collection and machine learning. By combining historical data and imagery, annotated or otherwise, with historical cost of work, system 200 can refine costing models for specific types of jobs to be more accurate and more automated in nature.

The cloud platform 340 allows files to be tied to key workflows (e.g., job quality assessment). Key workflows may include scoping, pricing, and quality assessment (QA). Imagery, recognized objects and context can be tied to these workflows to enhance efficiency and accuracy of these flows.

An embodiment combines 360-degree digital video, photos, audio, and other content to enable remote knowledge workers in real estate management and maintenance to effectively complete the following use cases without the requirement to visit physical locations. These use cases typically require an onsite visit to the property:

Pre-service: Capturing the "before" state of a project to refine the scope of the work.

Mid-service: Providing mid-project feedback for progress reports and change requests.

Post-service: Performing quality assessment of the work post-project completion.

USE CASE EXAMPLE

A 150-unit property has a variety of ongoing work needed, including unit "make ready" services, unit renovations, and unit repairs. The property has four standard unit configurations, or "unit types":

Studio
1 Bedroom
2 Bedroom
3 Bedroom

During pre-service, a low-skilled worker could follow basic instructions, walking from room to room and capturing video and images using device 310. He could perform this on each of the four-unit types. This pre-service data could serve as information for incoming work requests. Also, during pre-service for a specific work request, a low-skilled worker could follow basic instructions to capture video and imagery. These instructions would vary based on the job type requested. This data would be uploaded to a cloud system where highly skilled experts in job scoping and pricing could evaluate the data from a centralized operational location.

During mid-service, a pro could capture additional data to show progress of the project using similar digital capture techniques. This data would be available to a centralized fulfillment team of experts overseeing quality job progress.

During post-service, one or more of pros, low skilled workers, gig workers, tenants, etc. can be utilized onsite to capture video and imagery with standard instructions. There may be no onsite requirement for judgements to be made on the quality—rather these judgements may occur by experts offsite at a centralized operational location.

As such, one or more embodiments of the invention offer the ability to send and receive 360-degree video in the cloud, a user interface to annotate and mark-up images with added information, a collaboration layer to allow multiple users to view, edit, and contribute to a centrally hosted digital file, automatic appending of valuable property, customer, pro and job attributes to the digital file, and ability to send, share and update across multiple devices.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. At least one non-transitory computer-readable medium on which are stored instructions that, when executed by one or more processing devices, enable the one or more processing devices to perform a method, the method comprising the steps of:
   receiving from a user a 360-degree image of a property;
   performing on the image an image recognition routine, the image recognition routine identifying a first defective object in the property;
   determining from the image a first measurement of the first defective object based on a second measurement of a second object in the property; and
   based on the first measurement, estimating a type and quantity of material necessary to repair the identified first defective object.

2. The medium of claim 1, wherein the method further comprises identifying at least one measured dimension of the first defective object.

3. The medium of claim 2, wherein the method further comprises generating an estimate of a type and quantity of material necessary to repair the first defective object based on the at least one measured dimension of the first defective object.

4. At least one non-transitory computer-readable medium on which are stored instructions that, when executed by one or more processing devices, enable the one or more processing devices to perform a method, the method comprising the steps of:
   receiving from a user a 360-degree image of a structure;
   performing on the image a first image recognition routine, the first image recognition routine identifying in the image a first object of which the structure is comprised;
   performing on the image a second image recognition routine, the second image recognition routine identifying in the image one or more defects in the first object; and
   based on a measurement of a second object of which the structure is comprised generating an estimate of a type and quantity of material necessary to remedy the identified one or more defects.

5. The medium of claim 4, wherein the first image recognition routine identifies in the image the second object.

6. The medium of claim 5, wherein the method further comprises identifying at least one measured dimension of the second object.

7. The medium of claim 6, wherein the generated estimate is based on the at least one measured dimension of the second object.

* * * * *